Nov. 22, 1966   L. H. LEONARD, JR., ET AL   3,286,485
REFRIGERATION HEAT EXCHANGERS
Filed Jan. 4, 1965
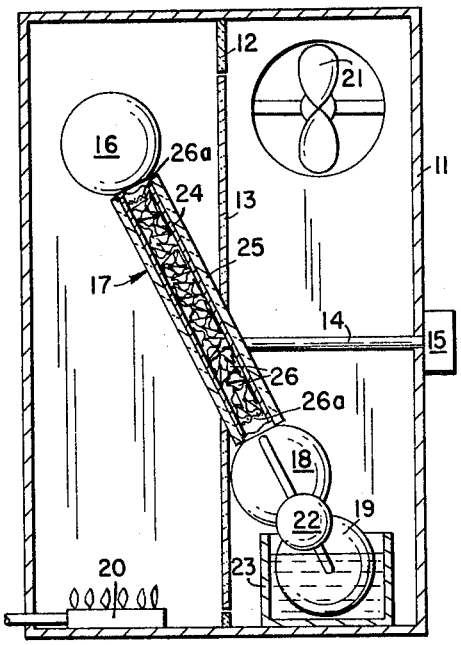
FIG. 1
FIG. 2
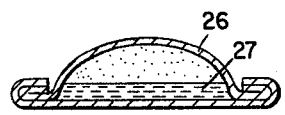
FIG. 3
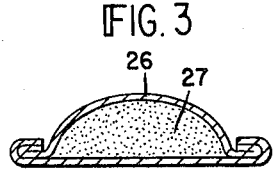
INVENTORS.
LOUIS H. LEONARD, JR.
JOSEPH E. EMBURY.
BY Robert F. Ruemeli
ATTORNEY.

3,286,485
REFRIGERATION HEAT EXCHANGERS
Louis H. Leonard, Jr., De Witt, and Joseph E. Embury, Memphis, N.Y., assignors to Carrier Corporation, Syracuse, N.Y., a corporation of Delaware
Filed Jan. 4, 1965, Ser. No. 423,071
3 Claims. (Cl. 62—477)

This invention relates to refrigeration and heat exchange and, more particularly, to a thermal storage heat exchanger for transferring heat between hot and cold fluids.

The invention is directed to utilizing the latent heat of a fluid for transferring heat between hot and cold fluids. For example, a hot fluid to be cooled is passed through a thermal storage heat exchanger and gives up its heat to a heat exchange fluid in the heat exchanger, causing the fluid to change state from a liquid to a gas, thus relying on the latent heat phenomena to store the heat from the hot fluid which is cooled thereby. A cold fluid to be heated is then passed through the heat exchanger and absorbs the latent heat from the heat exchange gas which changes state to a liquid as it transfers its latent heat to the cool fluid.

By utilizing the latent heat phenomena of a heat exchange fluid, a smaller volume of heat exchange fluid is required than would be required if the heat was stored by merely raising the sensible heat of the heat exchange fluid or material. Also, a smaller temperature difference is required between the two fluids to be heated and cooled when the latent heat of a heat exchange fluid is relied upon for storing the transferred heat since one of the fluids may be just slightly above the vapor temperature of the heat exchange fluid and the other fluid may be just below the vapor temperature of the heat exchange fluid.

As used herein the term "tempered" means to change heat content or temperature.

It is a primary object of this invention to provide a new and improved refrigeration machine and a heat exchanger and method of refrigeration and of heat exchange.

Another object of this invention is to provide a new and improved apparatus and method utilizing the latent heat of vaporization of a heat exchange fluid for transferring heat between relative hot and cold substances.

Still another object of this invention is to provide a new and improved absorption refrigeration system and method of providing refrigeration and, more particularly, to provide such a system and method in which latent heat of a heat exchange fluid is utilized to store heat upon cooling hot strong solution from an absorption generator and for releasing the stored heat to cool weak absorbent solution passing to the generator.

These and other objects of the invention will be apparent from the following description and drawing in which:

FIGURE 1 is a schematic side view of an absorption refrigeration machine including a thermal storage heat exchanger of the kind contemplated by this invention;

FIGURE 2 is an enlarged view with a portion broken away to illustrate a container of heat exchange fluid forming part of the thermal storage heat exchanger, with the fluid below its vapor temperature; and FIGURE 3 is a view similar to FIGURE 2 with the heat exchange fluid above its vapor temperature.

Referring to the drawings, an absorption refrigeration machine shown in FIGURE 1 is more fully described in my copending U.S. patent application Serial No. 423,072, filed January 4, 1965 entitled, "Heating and Cooling Apparatus and Method." In brief, the absorption machine includes a housing 11 having a generally vertical heat insulating barrier 12 with a center disc portion 13 mounted for rotation with a generally horizontal shaft 14 journalled in the housing 11 and driven by a motor 15 mounted on the housing. An absorption generator 16 is in fluid communication with one end of a thermal storage heat exchanger 17 having an opposite end in fluid communication with an absorber 18 which in turn communicates with an evaporator 19. The heat exchanger 17 is mounted on the disc 13 for rotation therewith, so that as the generator 16 is roated to the lower portion of its orbit it is heated by a burner 20 mounted in the housing 11 on one side of the heat insulating barrier 12. Upon heating the generator 16, absorbent solution in the generator is reconcentrated with refrigerant vapor passing upwardly through the heat exchanger 17 and into the absorber 18 and evaporator 19 where it is condensed, preferably with the aid of a fan 21 which blows cool air over the absorber 18 and evaporator 19. As the unit continues to rotate, hot, strong reconcentrated absorbent solution remaining in the generator flows to the absorber 18 by gravity and is suitably retained therein with the condensed refrigerant passing through a storage chamber and subcooler 22 into the evaporator 19. Continued rotation of the unit passes the evaporator 19 through a water trough 23 in the housing 11, and as the refrigerant in the evaporator vaporizes and is absorbed by the strong absorbent solution in the absorber 18 the water in the trough is cooled. Upon continued rotation of the unit, the now weak, relatively cold absorbent solution, that is colder than the reconcentrated solution passing from the generator, flows from the absorber 18 through the heat exchanger 17 back to the generator 16 which is again heated in the burner 20 to reconcentrate the absorbent solution.

The thermal storage heat exchanger 17 is illustrated in the form of tube 24 covered with thermal insulation 25 and containing a plurality of capsules or containers 26, suitably held in the tube 24 as by adhesively secured screen 26a at either end of the tube, and each containing a heat exchange fluid 27 (FIGURES 2 and 3) having a vapor temperature below the highest temperature of the refrigerant and relatively hot reconcentrated absorbent solution passing from the generator 16 to the absorber 18 and evaporator 19, and above the temperature of the relatively cold weak absorbent solution passing from the absorber 18 to the generator 16. Therefore, as the weak solution flows from the absorber 18 to the generator 16 the heat exchange fluid 27 becomes substantially all liquid (FIGURE 2), and as the hot refrigerant and strong solution flows from the generator 16 to the absorber 18 and evaporator 19 the heat exchange fluid 27 becomes substantially all vapor or gas (FIGURE 3). Thus, as the absorbent solution and refrigerant fluids to be tempered pass through the heat exchanger 17, the latent heat of the heat exchange fluid 27 is utilized to transfer the heat between the relatively hot and cold fluids.

The containers may be filled with any suitable heat exchange fluid 27, for example water which will absorb about 1,000 B.t.u./1b./° F. or ammonia which will absorb about 500 B.t.u./1b./° F. and has a very small specific volume.

As the relatively hot fluid to be tempered passes through the heat exchanger the liquid heat exchange fluid 27, as shown in FIGURE 2, vaporizes, as shown in FIGURE 3, and the heat is stored as latent heat of the heat exchange fluid in the containers 26. When a cool fluid to be tempered is passed through the heat exchanger 17, it absorbs the latent heat of the heat exchange fluid 27 which reverts to a liquid state as shown in FIGURE 2.

As a hot fluid to be cooled passes through the heat exchanger 17, the heat exchange fluid 27 in the container 26 at the entry end of the heat exchanger tube 24 will vaporize before the heat exchange fluid in the containers at the discharge end of the heat exchanger tube. Similarly, when the cool fluid to be tempered enters the heat exchanger, the heat exchange vapor in the containers at the entry end of the heat exchanger tube changes first to a liquid in giving up its latent heat.

In addition to the rotating absorption machine previously described, the thermal storage heat exchanger herein described is also applicable to gas turbine regenerative heat exchangers, rotary heat exchangers for air conditioning systems to exchange heat between exhaust air and a fresh air intake, intermittent type solution heat exchangers for lithium bromide absorption machines and the like, and various other applications involving intermittent heat exchangers particularly in the rotating regenerative field.

Substantially smaller and more versatile thermal storage heat exchangers may be provided by storing the heat in a multitude of small capsules or containers, as 26, filled with a suitable heat exchange fluid, as 27, so that the heat is stored in the form of latent heat of the heat exchange fluid, in place of storing the heat as sensible heat in a large mass of material. Each small thermal storage container contains just enough fluid so that when the fluid is a vapor, only gas will occupy the volume of the container. In order to insure a proper charge in each container, the container is filled with the heat exchange fluid at its critical temperature and pressure. The larger the number of containers in the heat exchanger, the more perfect is the heat exchange efficiency or the potential heat recovery, for example, a 50 percent recovery may result with one capsule, a 75 percent recovery with three capsules, a 91 percent recovery with ten capsules, and so forth.

With reference to manufacture of the containers, they may be made from a long continuous roll of tubing which is preferably completely evacuated and then charged with the heat exchanger fluid at its critical temperature and pressure. With both ends sealed off, the tube may be run through a suitable stamping machine which may stamp, cut and crimp the open end and intermediate portions of the tube 28.

To summarize the operation of the absorption machine, the hot, strong absorbent solution flows by gravity from the generator 16 through the heat exchanger 17 to the absorber 18 and comes in contact with the containers 26. As each individual container 26 is warmed up, the heat exchange fluid 27 therein is evaporated with the absorbed heat stored as latent heat of the heat exchange fluid. As the solution progresses through the heat exchanger, it becomes cooler and each container 26 assumes a different pressure-temperature level at which the absorbed heat is stored. Conversely when the weak solution flows from the absorber to the generator, in passing over the containers, the solution will cause the heat exchange fluid to condense and liberate the latent heat thereby heating up the solution.

While a preferred embodiment of the invention has been described and illustrated, it should be understood that the invention is not limited thereto but may be otherwise embodied within the scope of the following claims.

We claim:

1. In an absorption refrigeration machine the combination comprising an absorber and a generator, a heat exchanger in circuit between said absorber and generator for the passage therethrough from the absorber of relatively cold fluid to be tempered and for the passage therethrough from the generator of relatively hot fluid, said heat exchanger including an enclosure for the passage of said fluid to be tempered, a plurality of containers in said enclosure for heat exchange relationship with the fluid to be tempered, each said container extending a distance substantially less than the length of the enclosure so that the individual containers are not simultaneously in heat exchange relation with hot fluid and cold fluid, said containers each containing heat exchange fluid having a vapor temperature in its container below the highest normal temperature and above the lowest normal temperature encountered in the heat exchanger whereby heat is transferred through the latent heat of the heat exchange fluid in the containers between the hot and cold fluids passing through the heat exchanger.

2. In an absorption refrigeration machine the combination comprising an absorber and a generator, a heat exchanger in circuit between said absorber and generator for the selective passage therethrough of relatively cold weak absorbent solution to the generator and for the passage therethrough of relatively hot strong absorbent solution and refrigerant from the generator, said heat exchanger including an enclosure for the passage of said solution and refrigerant, and a plurality of containers in said enclosure for heat exchange contact with the solution and refrigerant, each said container extending a distance substantially less than the length of the enclosure so that the individual containers are not simultaneously in heat exchange relation with hot solution and cold solution, said containers each containing heat exchange fluid having a vapor temperature in its container below the highest normal temperature and above the lowest normal temperature encountered in the heat exchange whereby heat is transferred through the latent heat of the heat exchange fluid in the containers between the hot and cold absorbent solution and refrigerant passing through the heat exchanger.

3. In an absorption refrigeration machine the combination comprising an absorber and a generator, a heat exchanger in circuit between said absorber and generator for the passage therethrough in one direction of relatively cold weak absorbent solution from the absorber to the generator and alternately for the passage therethrough in the opposite direction of relatively hot strong absorbent solution and refrigerant from the generator, said heat exchanger including an enclosure for the passange of said solution and refrigerant, and a plurality of containers in said enclosure for heat exchange contact with the solution and refrigerant, each said container extending a distance substantially less than the length of the enclosure so that the individual containers are not simultaneously in heat exchange relation with hot solution and cold solution, said containers each containing a predetermined quantity of a heat exchange fluid having a vapor temperature under normal service conditions in the container such that the heat exchange fluid is substantially all gas at the highest normal temperature of the hot strong absorbent solution and refrigerant while passing through the enclosure from said generator and is substantially all liquid at the lowest normal temperature of the cold weak absorbent solution passing through the enclosure from the absorber to the generator, whereby heat is transferred through the latent heat of the heat exchange fluid in the containers between the hot and cold absorbent solution and refrigerant passing through the heat exchanger.

References Cited by the Examiner
UNITED STATES PATENTS

| 1,120,246 | 12/1914 | Schmidt | 165—105 |
| 1,725,906 | 8/1929 | Gay | 165—105 |

FOREIGN PATENTS

| 559,075 | 9/1932 | Germany. |
| 577,709 | 6/1933 | Germany. |

LLOYD L. KING, *Primary Examiner.*